(No Model.)
W. W. PAGE.
HOUSE SEWERAGE APPARATUS.
No. 364,433. Patented June 7, 1887.
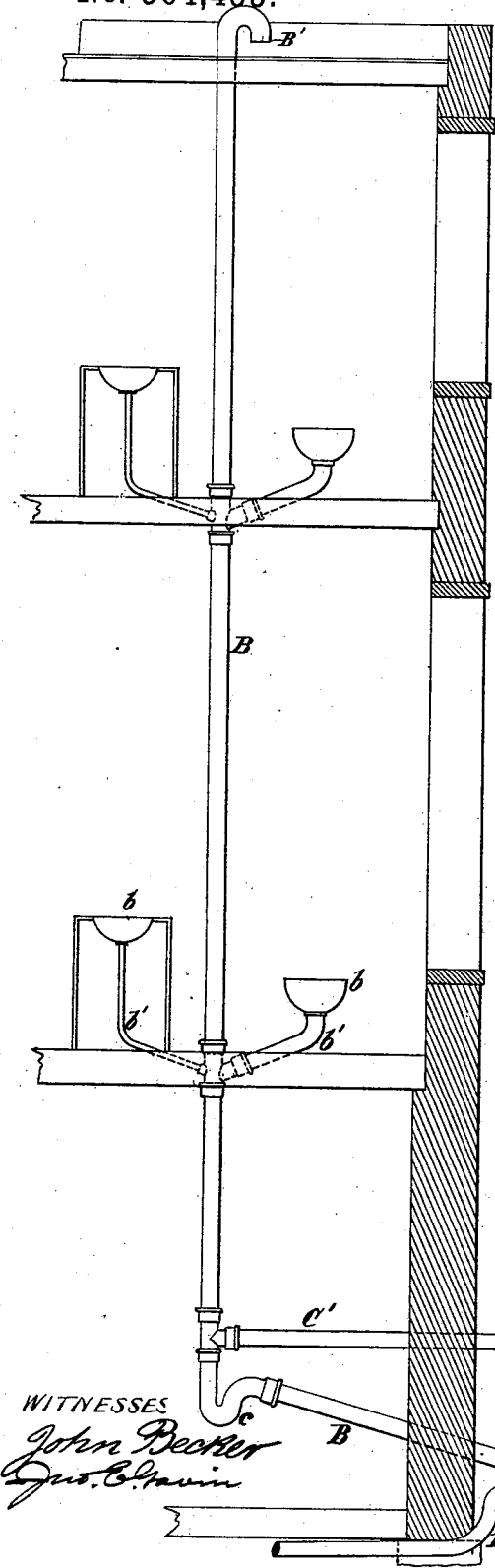
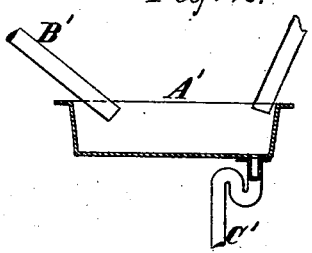
Fig. 2.
Fig. 1.
WITNESSES
John Becker
INVENTOR
William W. Page
per
Behrens & Cady
Attys.

UNITED STATES PATENT OFFICE.

WILLIAM W. PAGE, OF NEW YORK, N. Y.

HOUSE-SEWERAGE APPARATUS.

SPECIFICATION forming part of Letters Patent No. 364,433, dated June 7, 1887.

Application filed January 12, 1887. Serial No. 224,154. (No model.)

*To all whom it may concern:*

Be it known that I, WILLIAM W. PAGE, of New York city and county, State of New York, have invented a new and useful Improvement in House-Sewerage Apparatus, of which the following is a specification.

My invention has for its object to prevent poisonous gases and foul odors from ascending into dwelling-houses and buildings from the sewer. Ordinarily the wash-stands, basins, water-closets, and bath-rooms of a house connect with a drain-pipe extending through the several stories and leading from the ground-floor to the sewer. To prevent sewer-gas and bad odors from entering the different rooms, the branch pipes connecting the house drain-pipe with the several wash-stands, water-closets, &c., have been trapped; but these traps have been found to be ineffectual, as they do not remain perfectly sealed, and at times are siphoned by the action of the tides or the plumbing arrangement of adjacent buildings. Sewer-gas which has gained access to the house drain-pipe escapes through the traps and enters the rooms, exposing the occupants to sickness and death. To effectually overcome this, I so cut off the house drain-pipe that any gases which may arise will be carried off into the open air before they can enter the drain-pipe of the house. I accomplish this by opening or cutting off the drain-pipe, so as to form a basin or receptacle which is practically a continuation of the drain-pipe for the purpose of discharging waste, and yet allows the free escape of gases and odors from the sewer into the open air.

In the accompanying drawings I have shown my invention, in Figure 1, as in use in connection with the several floors of a house. Fig. 2 is a modification.

In carrying out my invention I construct the house drain-pipe B with a suitable basin or receptacle, A, of any convenient shape or size, and having an open top, *a*, which may be covered by a grating or other apertured cover. The basin A is located at any convenient point, either above the ground at the side of the house or in the ground at a short distance from the house, or in the cellar. As shown in Fig. 1, the basin A is joined at one side to the house drain-pipe B, which projects in an inclined direction from the house, and at the other side to a pipe, C, which leads to the sewer. It will thus be seen that the basin A practically forms a continuation of the house drain-pipe B with the sewer, and that by this construction any gases or odors ascending pipe C from the sewer will be carried off into the open air from basin A. The house drain-pipe B extends to the top of the house, as shown, where it terminates in a ventilator-opening, B', and near its lower end is provided with a pipe, C', opening into the open air at the side of the house, so that the pipe B is practically open at both ends to allow air to pass freely through it.

The basins and sinks *b* are not trapped, as usual, in each branch pipe *b'*; but instead thereof a single trap is employed, as at *c*. By means of the basin A no siphoning of the trap *c* can take place, and if the seal therein becomes unclosed there will still be no opportunity for gases or foul odors to escape into pipe B, as the pipe B is disconnected from the sewer. Moreover, by employing a single trap, instead of a number, a great annoyance from traps freezing and bursting is obviated, and but one trap has to be looked after in case of any accident.

In connection with the basin A, I preferably use an automatic flushing device to keep it clear, so that the gases and foul odors may readily escape thereby. Any form of flushing device may be used. In the device shown I employ an automatic flush-tank, D, situated in any convenient position and connected with basin A by a pipe, E. The opening of pipe B into basin A is normally closed by hinged valve *e*, having an arm, *e'*, connected by a chain or wire, *f*, to a lever, *g*, operating a valve, *h*, closing pipe E. A valve, *j*, closing the supply-pipe F, is operated by a float, *j'*. To continue the flow through the pipe E after the valve *h* has closed, the chamber *d* is located below the tank D.

The operation of the flushing device is as follows: A discharge occurring through the pipe B forces open valve *e*, which pulls on lever *g* to open valve *h*, thereby causing a discharge of water into basin A. The level of the water falling in tank D causes float *g'* to open valve *j*, and rising with the supply to close it. By means of the chamber *d*, when the valve *e* has closed to normal position again by its own weight, the discharge having taken place through pipe B, and valve h having seated itself again, the flow through pipe E continues from the water remaining in the chamber d and thoroughly washes out basin A. The closed valve e prevents any gases or foul odors escaping from the sewer from ascending pipe B.

While I have described a flushing device in connection with basin A, I do not limit myself to the use thereof, as the valve e may be dispensed with and, the basin A periodically cleansed in any suitable way—as, for instance, by a main of water leading thereto and controlled by a stop cock. To check the escape of sewer-gas from the sewer, it may be found advisable to locate a trap, D', in pipe C. This, however, merely limits the amount of gases or foul odors escaping, but does not necessarily form a perfect seal.

By my invention the house is kept entirely free from sewer-gas and foul odors, and there is no danger in having stationary wash-stands in the sleeping-apartments and other rooms, and siphonage is entirely avoided. The pipe C may be constructed, as shown in Fig. 1, with trap D', so that water may remain in the bottom of the basin A and form a seal.

In Fig. 2 I have shown a modification of my device. In this instance the basin A' is a shallow receptacle having the house drain-pipe B' projecting into it at the opposite end from the mouth of the discharge-pipe C'. By this construction the gases and foul odors from pipe C will escape into the air away from the outlet B'. This is a suitable construction where the basin A' is located in the cellar or ground.

I am aware that a ventilator-pipe has been located outside of the house extending vertically from the drain-pipe; but this device does not effectually carry off the gases and foul odors from the sewer as mine does.

Having thus described my invention, what I claim is as follows:

1. As an improvement in house-sewerage apparatus, the combination, with a drain-pipe and valveless sewer-pipe, of a receptacle communicating with the atmosphere, and having separate and direct communications with said drain and sewer pipes and interposed between the same to form, in connection with said sewer-pipe, a continuous unobstructed passage for the discharge of all sewage, said sewer-pipe communicating with the receptacle at the lowermost point of the same, substantially as set forth.

2. As an improvement in house-sewerage apparatus, the combination, with the drain-pipe and valveless sewer-pipe, of a receptacle communicating with the atmosphere, and having separate communications with said drain and sewer pipes and interposed between the same to form, in connection with said sewer-pipe, a continuous unobstructed passage for the discharge of all sewage matter from the drain-pipe, said sewer-pipe communicating with the receptacle at the lowermost point of the same, and an automatically-operating flushing device for flushing said receptacle, substantially as set forth.

3. An improvement in house drain-pipes, consisting of an open receptacle forming part of the house drain-pipe, having an automatic valve closing its connection therewith and connected with the flush-tank, substantially as described.

4. The combination, in a house-sewerage apparatus, of a drain-pipe and a receptacle communicating with the same, a sewer-pipe having a separate communication with said receptacle at the lowermost point of the same and forming a continuation of the discharge through said drain-pipe and receptacle, a flushing-tank connected with said receptacle for flushing the latter, and an automatic valve closing the lower end of the drain-pipe, substantially as set forth.

In testimony whereof I have hereunto subscribed my name.

WILLIAM W. PAGE.

Witnesses:
 JNO. E. GAVIN,
 BENJAMIN MILLER.